United States Patent
Lin

(10) Patent No.: US 9,420,194 B2
(45) Date of Patent: Aug. 16, 2016

(54) METHODS AND SYSTEMS FOR GENERATING LONG SHUTTER FRAMES

(71) Applicant: HTC Corporation, Taoyuan County (TW)

(72) Inventor: Chun-Ta Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 24 days.

(21) Appl. No.: 14/285,652

(22) Filed: May 23, 2014

(65) Prior Publication Data

US 2015/0341538 A1    Nov. 26, 2015

(51) Int. Cl.
| | |
|---|---|
| H04N 5/76 | (2006.01) |
| H04N 5/235 | (2006.01) |
| H04N 1/21 | (2006.01) |
| H04N 5/232 | (2006.01) |

(52) U.S. Cl.
CPC .............. *H04N 5/2353* (2013.01); *H04N 1/21* (2013.01); *H04N 1/2112* (2013.01); *H04N 5/2355* (2013.01); *H04N 5/23232* (2013.01); *H04N 5/23277* (2013.01)

(58) Field of Classification Search
CPC .................................................... H04N 5/2353
See application file for complete search history.

(56) References Cited

U.S. PATENT DOCUMENTS

| | | | |
|---|---|---|---|
| 8,830,360 B1* | 9/2014 | Burt .......................... | H04N 5/21 348/241 |
| 2012/0243763 A1* | 9/2012 | Wen .......................... | G06T 5/50 382/131 |
| 2012/0257079 A1* | 10/2012 | Ninan .................. | H04N 5/2355 348/222.1 |
| 2014/0063229 A1* | 3/2014 | Olsson ................. | H04N 5/2252 348/84 |

FOREIGN PATENT DOCUMENTS

| | | |
|---|---|---|
| TW | 201110684 A | 3/2011 |
| TW | 201315218 A | 4/2013 |
| TW | 201325225 A | 6/2013 |

OTHER PUBLICATIONS

Corresponding Taiwanese Office Action that these art references were cited on Jun. 27, 2016.

* cited by examiner

*Primary Examiner* — Gary C Vieaux
(74) *Attorney, Agent, or Firm* — CKC & Partners Co., Ltd.

(57) ABSTRACT

Methods and systems for generating long shutter frames are provided. First, frames are captured or obtained from a video file. A weight is assigned to the respective frame. The frames are composed according to the corresponding weights to generate a long shutter frame.

13 Claims, 5 Drawing Sheets

METHODS AND SYSTEMS FOR GENERATING LONG SHUTTER FRAMES

BACKGROUND OF THE INVENTION

1. Field of the Invention

The disclosure relates generally to methods and systems for generating long shutter frames, and, more particularly to methods and systems for generating long shutter frames based on multiple frames.

2. Description of the Related Art

Recently, portable devices, such as handheld devices, have become more and more technically advanced and multifunctional. For example, a handheld device may have telecommunications capabilities, e-mail message capabilities, image capture capabilities, an advanced address book management system, a media playback system, and various other functions. Due to increased convenience and functions of the devices, these devices have become necessities of life.

As described, a handheld device may have image capture capabilities. Sometime, people want a long shutter effect on image/video capturing. Currently, the long shutter effect need supports of hardware, such as an adjustable aperture of a camera, or equipments, such as a ND (Neutral Density) filter. No way to generate digital lung shutter images or videos for those devices without related hardware supports.

BRIEF SUMMARY OF THE INVENTION

Methods and systems for generating long shutter frames are provided.

In an embodiment of a method for generating long shutter frames, frames are obtained. A weight is assigned to the respective frame. The frames are composed according to the corresponding weights to generate a long shutter frame.

An embodiment of a system for generating long shutter frames comprises a storage unit and a processing unit. The storage unit comprises a plurality of frames. The processing unit assigns a weight is assigned to the respective frame, and composes the frames according to the corresponding weights to generate a long shutter frame.

In some embodiments, the respective frames are captured by an image capture unit with a same exposure time. In some embodiments, the respective frames are obtained from a video file.

In some embodiments, a weight is assigned to respective regions of the respective frames, wherein the corresponded regions in the respective frames are composed based on the respective weights.

In some embodiments, an image preprocess is performed on the respective frames before the frames are composed. In some embodiments, the image pre-process comprises an image stabilization process.

In some embodiments, a scene for the respective frames is detected, and a weight is assigned to the respective frames according to the detected scene.

Methods for generating long shutter frames may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for generating long shutter frames are provided.

Figure 1:
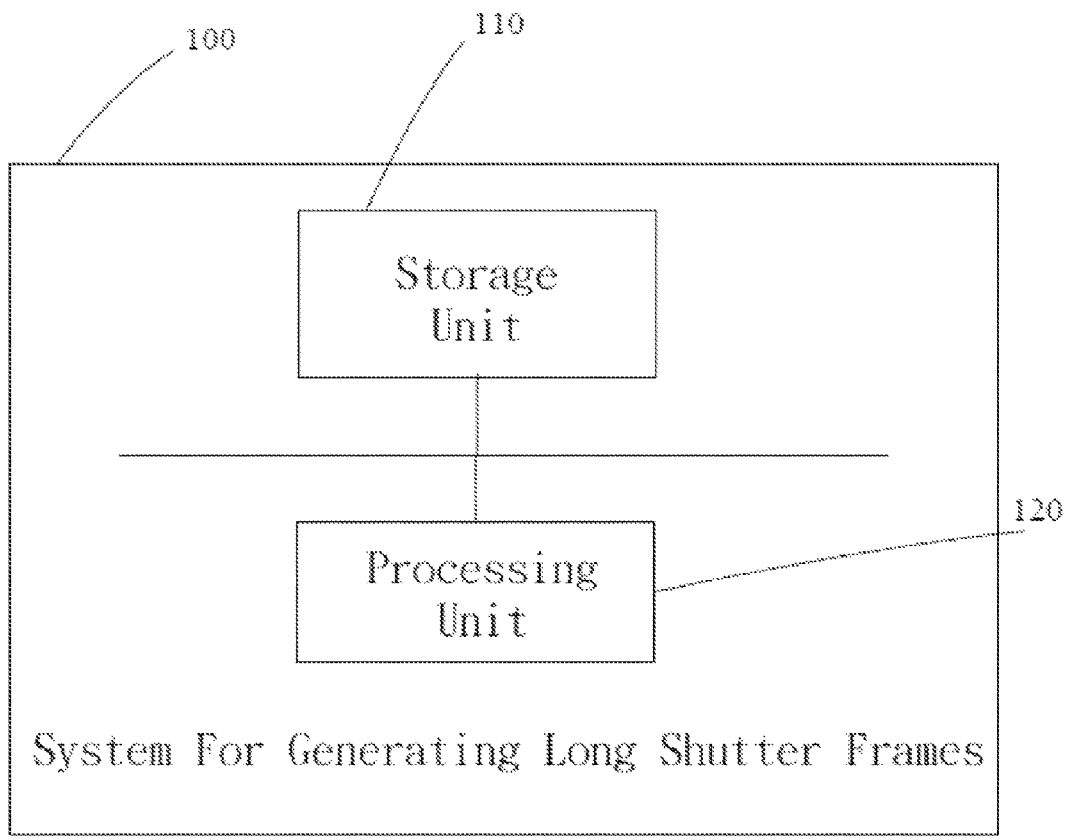
FIG. 1 is a schematic diagram illustrating an embodiment of as system for generating long shutter frames of the invention.

FIG. 1 is a schematic diagram illustrating an embodiment of a system for generating long shutter frames of the invention. The system for generating long shutter frames 100 can be used in an electronic device, such as a computer, or a portable device, such as a digital camera, a handheld device such as a mobile phone, a smart phone, a PDA (Personal Digital Assistant), a GPS (Global Positioning System), or any picture-taking device.

The system for generating long shutter frames 100 comprises a storage unit 110 and a processing unit 120. The storage unit 110 comprises a plurality of frames. It is understood that, in some embodiments, the system for generating long shutter frames 100 can also comprise an image capture unit (not shown in FIG. 1). The image capture unit may be a CCD (Charge Coupled Device) or a CMOS (Complementary Metal-Oxide Semiconductor), placed at the imaging position for objects inside the electronic device. The frames can be captured via the image capture unit. In some embodiments, a function called 'continuous shot' can be provided on the electronic device. In the continuous shot mode, the image capture unit can take image frames immediately one after another in to short amount of time. That is, when the continuous shot function is performed, a continuous image capture process is performed to continuously capture a plurality of image frames in sequence. It is understood that, in some embodiments, the frames can be respectively captured with a predefined time interval, and/or with a same exposure time. Additionally, in some embodiments, the frames can be obtained from a video file. It is also understood that, in some embodiments, the system for generating long shutter frames 100 can also comprise a display unit (not shown in FIG. 1). The display unit can display related figures and interfaces, and related data, such as the image frames continuously captured by the image capture unit. It is understood that, in some embodiments, the display unit may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit. The processing unit 120 can control related components of the system for generating long shutter frames 100, process the image frames, and perform the methods for generating long shatter frames, which will be discussed further in the following paragraphs. It is noted that, in some embodiments, the system for generating long shutter frames 100 can further comprise a focus unit (not shown in FIG. 1). The processing unit 120 can control the focus unit to perform a focus process for at least one object during the photography process.

Figure 2:
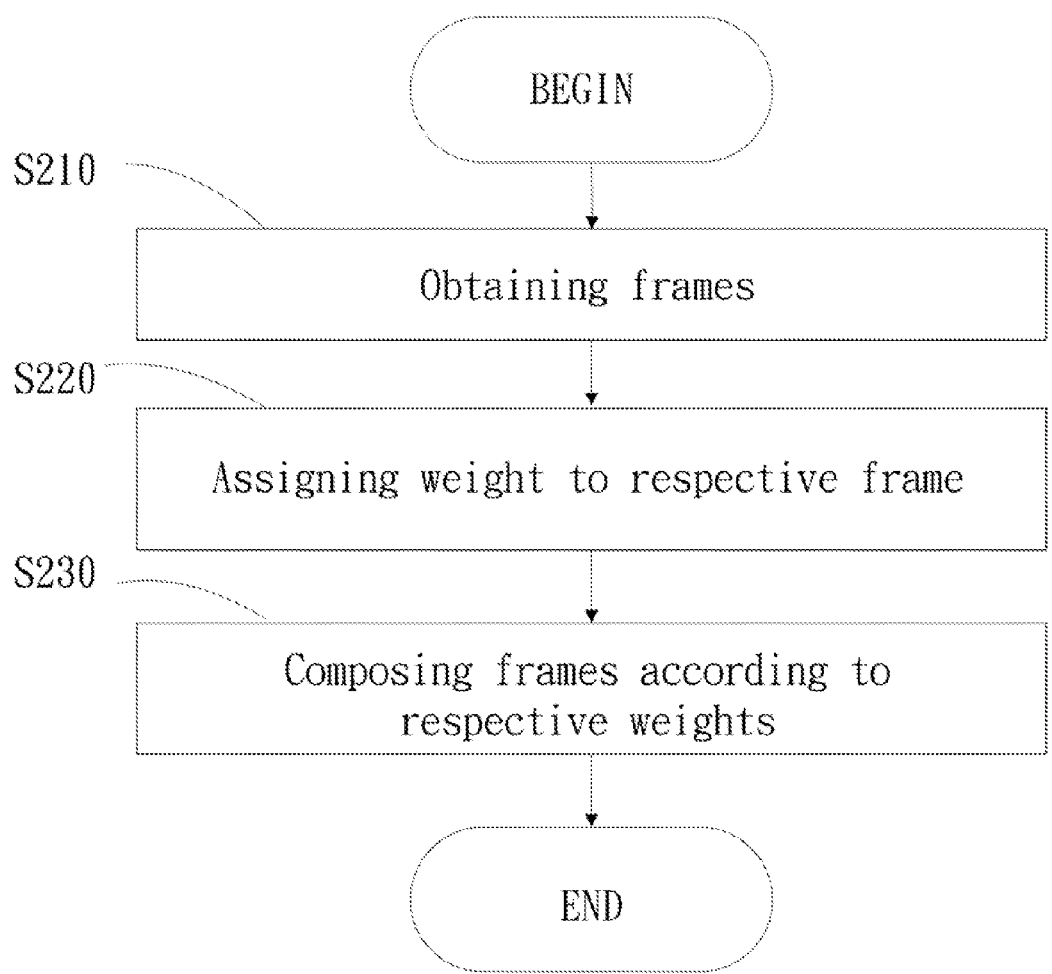
FIG. 2 is a flowchart of an embodiment of a method for generating long shutter frames of the invention.

FIG. 2 is a flowchart of an embodiment of a method for generating long shutter frames of the invention. The method for generating long shutter frames can be used in an electronic device, such as a computer, or a portable device, such as a digital camera, a handheld device such as a mobile phone, a smart phone, a PDA, a GPS, or any picture-taking device.

Figure 3:
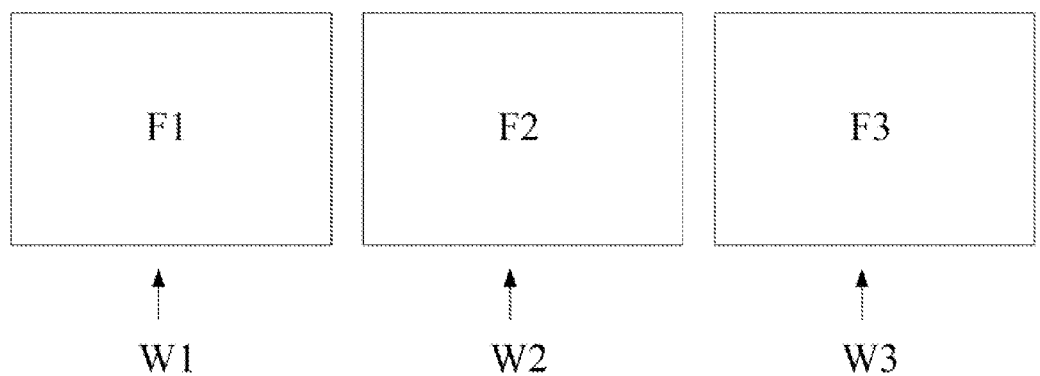
FIG. 3 is a schematic diagram illustrating weights for frames of the invention.
Figure 4:
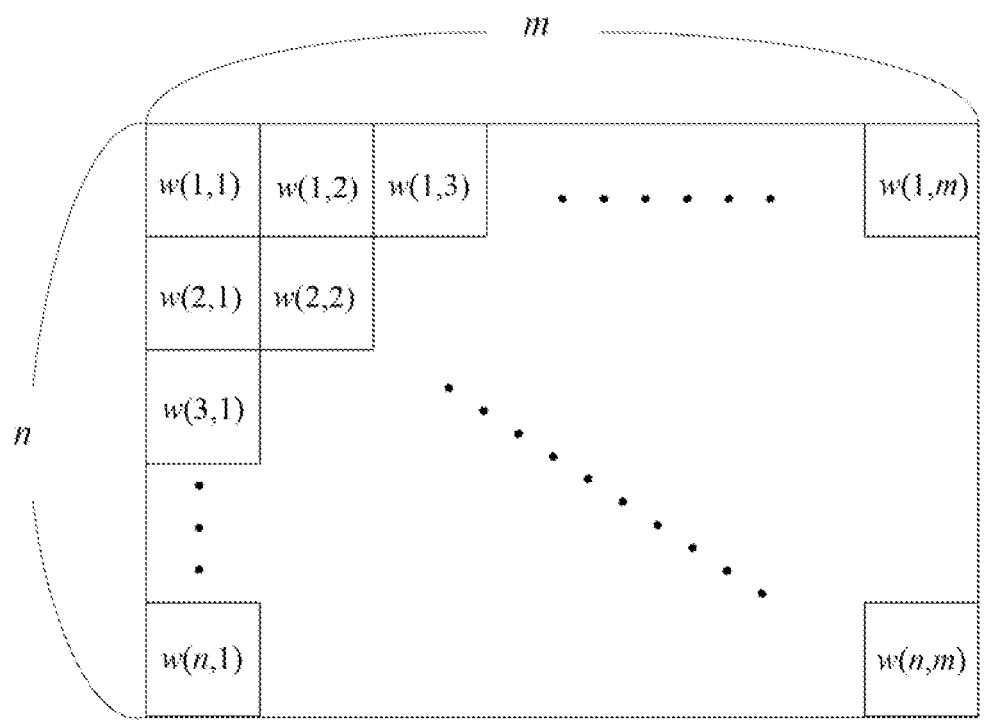
FIG. 4 is a schematic diagram illustrating weights for respective regions of a frame of the invention.

In step S210, frames are obtained. It is understood that, in some embodiments, the respective frames can be captured by an image capture unit with a same exposure time. It is understood that, in some embodiments, the frames can be respectively captured with a predefined time interval, and/or with a same exposure time. In some embodiments, the respective frames are obtained from a video file. In step S220, a weight is assigned to the respective flame. It is understood that in some embodiments, the weight can be set based on the unit of frame. As shown in FIG. 3, three frames F1, F2 and F3 are obtained, wherein frame F1 is assigned with a weight W1, frame F2 is assigned with a weight W2, and frame F3 is assigned with a weight W3. It is understood that, the value of the respective weights can be various according to different applications and requirements. For example, the last captured flame may have a higher weight than that of others. In some embodiments, the weight can be set based on the unit of region in a frame. As shown in FIG. 4, there are m×n regions in the frame, and each region can be set a weight w(i,j), wherein 1≤i≤n, and 1≤i≤m. Similarly, the value of the respective weight can be various according to different applications and requirements. For example, the region having higher brightness may have a higher weight than that of others. In step S230, the frames are composed according to the corresponding weights to generate a long shutter frame. It is understood that, the frames can be composed according to an image composition algorithm. The image composition algorithm is various and well-known, and omitted here. It is understood that, in some embodiments, before the frames are composed, an image pre-process can be performed on the respective frames. In some embodiments, the image pre-process can comprise an image stabilization process.

Figure 5:
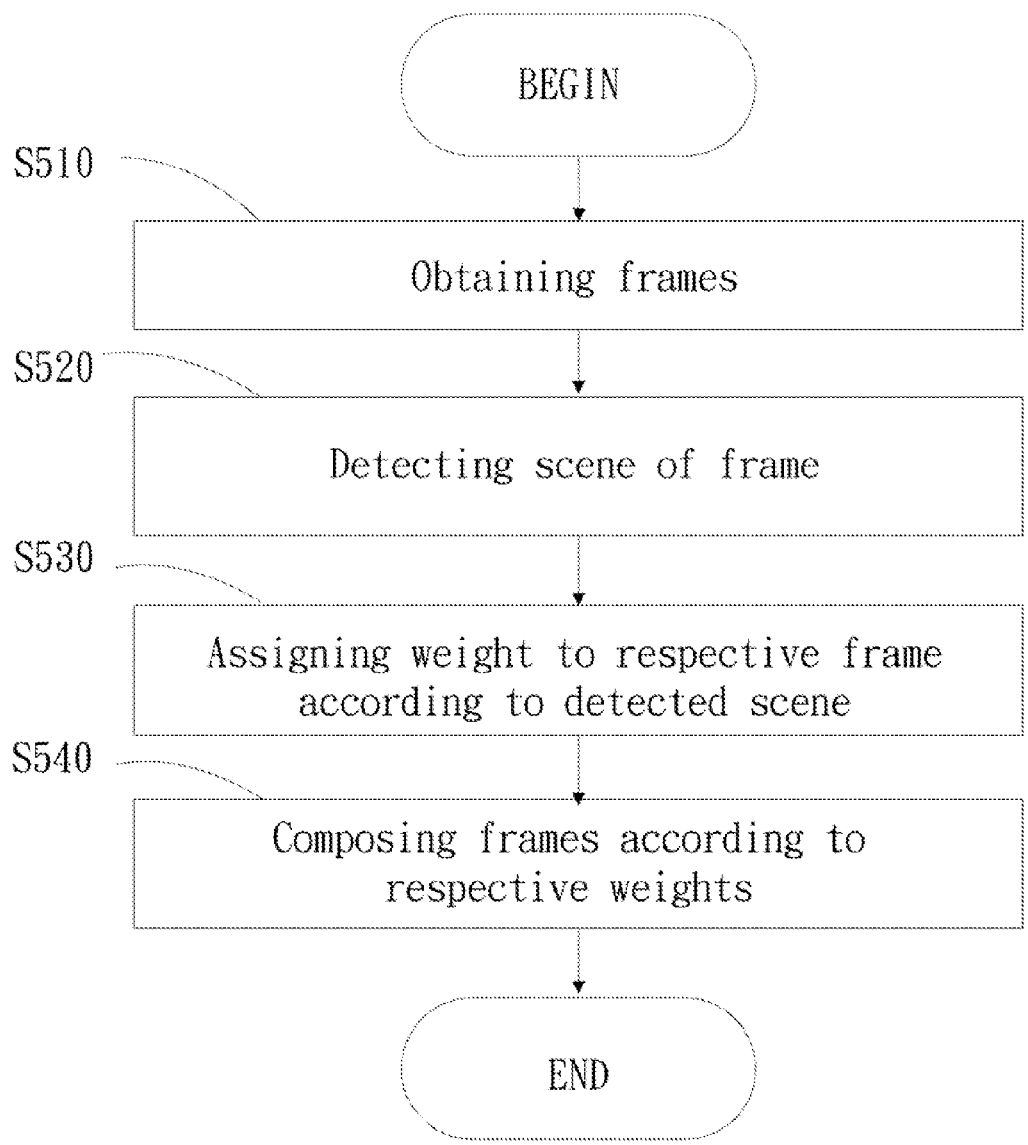
FIG. 5 is a flowchart of another embodiment of a method for generating long shutter frames of the invention.

FIG. 5 is a flowchart of another embodiment of a method for generating long shutter frames of the invention. The method for generating long shutter frames can be used in an electronic device, such as a computer, or a portable device, such as a digital camera, a handheld device such as a mobile phone, a smart phone, a PDA, a GPS, or any picture-taking device. In the embodiment, a scene of a frame is detected, and a weight corresponding to the respective frame can be automatically set In step S510, frames are obtained. It is understood that, in some embodiments, the respective frames can be captured by an image capture unit with a same exposure time. It is understood that, in some embodiments, the frames can be respectively captured with a predefined time interval, and/or with a same exposure time. In some embodiments, the respective frames are obtained from a video file. In step S520, a scene of at least one of the frames is detected. It is understood that, the scene detection technology can be various, and the present invention is not limited. For example, characteristic points of specific scenes can be recorded in advance, and the frame can be analyzed to obtain corresponding characteristic points, which can be compared with the recorded ones to know a corresponding specific scene. In step S530, a weight is assigned to the respective frame according to the detected scene. It is also understood that, in some embodiments, the weights for various scenes can be set in a table. Once the scene of the frame is detected, the table can be accordingly looked up to obtain the corresponding weights. Similarly, in some embodiments, the weight can be set based on the unit of frame, or based on the unit of region in a frame. The value of the respective weight can be various according to different applications and requirements, and the present invention is not limited thereto. In step S540, the frames are composed according to the corresponding weights to generate a long shutter frame. Similarly, the frames can be composed according to an image composition algorithm. The image composition algorithm is various and well-known, and omitted here. Similarly, in some embodiments, before the frames are composed, an image pre-process can be performed on the respective frames. In some embodiments, the image pre-process can comprise an image stabilization process.

Therefore, the methods and systems for generating long shutter frames of the present invention can generate long shutter frames based on multiple frames, thus providing long shutter effects to those devices without hardware supports.

Methods for generating long shutter frames, may take the form of a program code (i.e., executable instructions) embodied in tangible media, such as floppy diskettes, CD-ROMS, hard drives, or any other machine-readable storage medium, wherein, when the program code is loaded into and executed by to machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for generating long shutter frames for use in an electronic device, comprising:
   obtaining a plurality of frames;
   detecting a plurality of specific scenes respectively corresponding to the frames;
   assigning a plurality of weights respectively corresponding to the frames according to the specific scenes; and
   composing the frames according to the weights to generate a long shutter frame;
   wherein a plurality of determined characteristic points of the specific scenes are recorded in advance, and the frames are analyzed to obtain a plurality of current characteristic points, the current characteristic points are compared with the determined characteristic, points to know the specific scenes.

2. The method of claim 1, wherein the frames are captured by an image capture unit with a same exposure time.

3. The method of claim 1, wherein the frames are obtained from a video file.

4. The method of claim 1, further comprising assigning a weight to respective regions of the frames, wherein the corresponded regions in the frames are composed based on the respective weights.

5. The method of claim 1, further comprising performing an image pre-process on the frames before the frames are composed.

6. The method of claim 5, wherein the image pre-process comprises an image stabilization process.

7. A system for generating long shutter frames for use in an electronic device, comprising:
- a storage device for storing a plurality of frames; and
- a processor for detecting a plurality of specific scenes respectively corresponding to the frames, assigning a weight to the frames according to the specific scenes, and composing the frames according to the weights to generate a long shutter frame;
- wherein a plurality of determined characteristic points of the specific scenes are recorded in advance, and the frames are analyzed to obtain a plurality of current characteristic points the current characteristic points are compared with the determined characteristic points to know the specific scenes.

8. The system of claim 7, wherein the frames are captured by an image capture unit with a same exposure time.

9. The system of claim 7, wherein the frames are obtained from a video file.

10. The system of claim 7, wherein the processing unit further assigns a weight to respective regions of the frames, wherein the corresponded regions in the frames are composed based on the respective weights.

11. The system of claim 7, wherein the processing unit further performs an image pre-process on the frames before the frames are composed.

12. The system of claim 11, wherein the image pre-process comprises an image stabilization process.

13. A non-transitory machine-readable storage medium comprising a computer program, which, when executed, causes a device to perform a method for generating long shutter frames, wherein the method comprises:
- obtaining a plurality of frames;
- detecting a plurality of specific scenes respectively corresponding to the frames;
- assigning a plurality of weights respectively corresponding to the frames according to the specific scenes; and
- composing the frames according to the weights to generate a long shutter frame;
- wherein a plurality of determined characteristic points of the specific scenes are recorded in advance, and the frames are analyzed to obtain a plurality of current characteristic points, the current characteristic points are compared with the determined characteristic points to know the specific scenes.

* * * * *